United States Patent [19]
Bracht et al.

[11] 3,834,141
[45] Sept. 10, 1974

[54] PICK-UP BALER, SPRAYER AND COMPACTOR COMBINATION

[75] Inventors: Karl Friedrich Bracht, Hotzum; Herbert A. Strube; Hans Otto Sacht, both of Wolfenbuttel, all of Germany

[73] Assignee: Gebrueder Welger, Wolfenbuettel, Germany

[22] Filed: Jan. 17, 1973

[21] Appl. No.: 324,398

[30] Foreign Application Priority Data
Jan. 18, 1972  Germany............................ 2202114

[52] U.S. Cl.................... 56/341, 56/364, 56/DIG. 5
[51] Int. Cl............................................. A01d 39/00
[58] Field of Search ............ 56/1, 341, 364, DIG. 5; 100/73–75

[56] References Cited
UNITED STATES PATENTS
2,760,625   8/1956   Lohnert............................ 56/341 X
3,280,543   10/1966   Lawrence et al. ....................... 56/1

Primary Examiner—Hugh R. Chamblee
Assistant Examiner—J. N. Eskovitz
Attorney, Agent, or Firm—Otto John Munz

[57] ABSTRACT

A pick-up baler for agricultural crops including means to pick up the crop and to direct the flow of the material from a pick-up device as a sheet over an intermediate conveyor into a bale chamber for spraying the picked-up swath with a liquid preserving agent, subsequently to which the swath is compressed.

15 Claims, 6 Drawing Figures

FIG.1
FIG.2
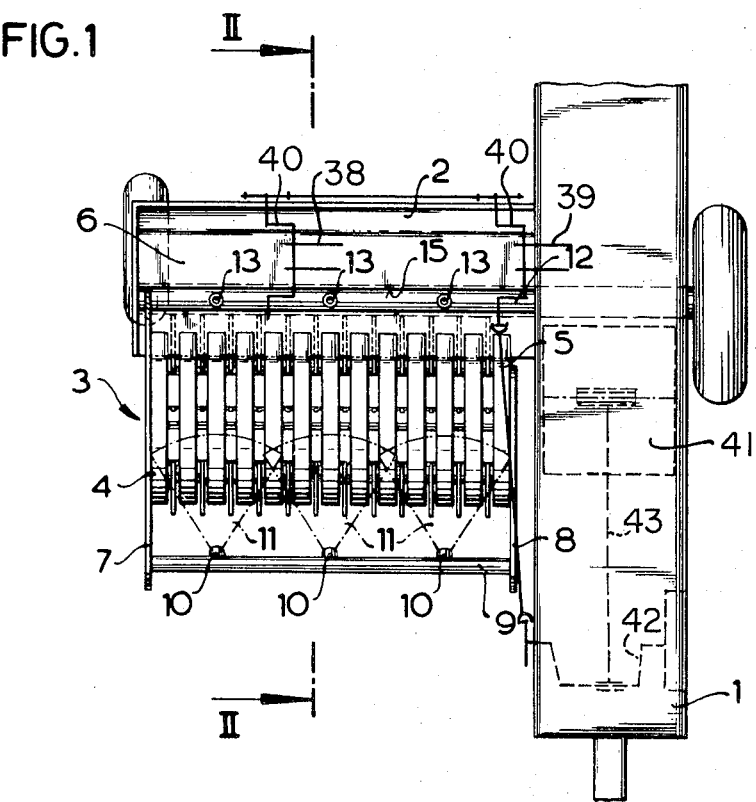
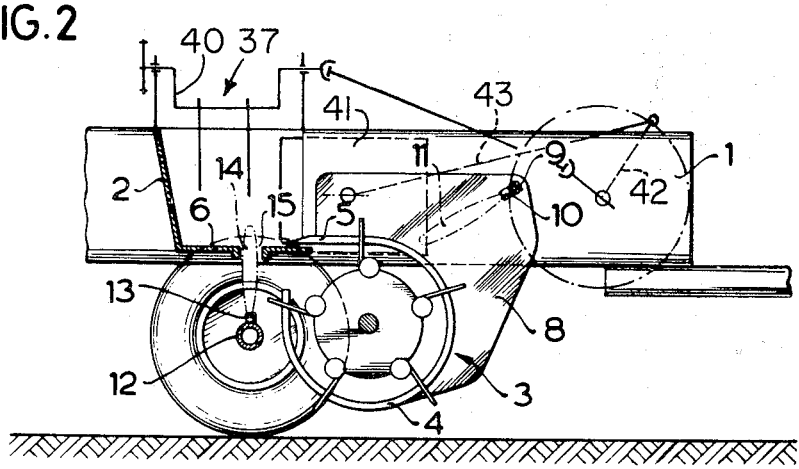

PICK-UP BALER, SPRAYER AND COMPACTOR COMBINATION

CROSS-REFERENCE TO A RELATED PATENT APPLICATION

Priority of the corresponding German Patent application Serial No. P 22 02 114.3 filed Jan. 18, 1972 is claimed under the Convention.

BACKGROUND OF THE INVENTION

1. Field of the Invention

A baling apparatus including means to disperse into the baled material another substance in intimate contact therewith prior to compacting. (U.S.Cl. 100/71.)

2. Description of the Prior Art

The prior art is represented by U.S. Patent No. 3,280,543 to S. L. Lawrence et al. Balers were proposed with a spraying nozzle above the conveying table to spray the picked-up swath from above with a preserving agent. Such arrangement has the disadvantage that the material picked up is unevenly wetted by the preserving agent. After compaction by the ram the bales have a high acid concentration in the upper part and a very low acid concentration in the lower part. In consequence mould formation occurs in the lower section of the bales. In order to avoid the mould it would be necessary to increase the amount of acid applied, at excessively high costs.

SUMMARY OF THE INVENTION

The objects of the invention are to provide a baler, which:

permits storage of moist hay without danger of mould formation by spraying it during the baling operation and prior to its compacting and stacking with a preservative, such as propionic acid;

permits an early harvesting of wet crops to be baled without the loss in their nutrient values, for instance in inclement weather, or even prior to their maturity while their nutrient qualities are at their highest point as is the case for instance with alfalfa, clover, or of dried crops subject to undue fragmentation;

employs an even thorough spray system of layers of the harvested crops during the baling operation between the pick-up stage and the compacting stage, while utilizing only the minimum amount of a preserving agent, necessary to accomplish the purpose.

Other objects and many of the advantages of the present invention will become apparent to those skilled in the art from the following description and accompanying drawings.

BRIEF DESCRIPTION OF THE DRAWINGS

FIG. 1 shows a plan view of a pick-up baler in accordance with the invention.

FIG. 2 is a side view, partly in section through the pick-up device and the transverse conveyor table along the line II—II of FIG. 1; the transverse conveyor mechanism is omitted in this case.

In the several Figures of the drawings the same numerals denote the same or equivalent parts. Repetitions of descriptions of parts common to the several Figures are omitted for purposes of brevity.

DESCRIPTION OF THE PREFERRED EMBODIMENTS

Figure 3:
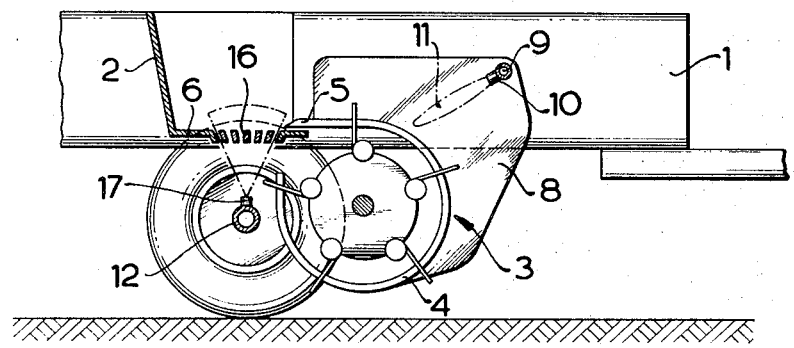
FIGS. 3 to 6 show several improvements of the invention described in the views shown in FIGS. 1 and 2.

The present invention discloses a pick-up baler for agricultural field crops, comprising a pick-up device adapted to pass the cut crop to an intermediate conveyor.

A bale chamber and a device are provided for spraying the picked-up swath, before it is compacted, with a liquid preserving agent evenly and sparingly distributed by means of spray nozzles which are arranged and so spaced, as to direct the preserving agent both from above and from below onto the picked-up crop as it passes through the baler in the form of a sheet so that the whole breadth of the crop sheet is sprayed. The even distribution of the preserving agent over the whole breadth of the loose sheet of picked-up crop both from above and from below makes possible an economic application of the preserving agent.

Thus, it is possible to bale and store moist hay in the form of high density bales without impairment of the storage properties of the hay by bacterial decomposition.

High density bales of agricultural products, such as hay and straw, treated in accordance with the present invention are capable of withstanding an extended storage and under adverse weather conditions for much longer periods and with less dependence on weather conditions than bales of the prior art and thus treatment in accordance with the present invention is profitable.

The method of spraying feeds with organic acids also is of importance for silage preparation with a high density baler. In accordance with the prior art wilted crop pressed or compacted into bales is usually stacked up in a silo and covered with a high quality expensive foil or sheet to provide a hermetic seal. However, on puncturing the foil substantial losses in nutrient value occur owing to subsequent fermentation. Such losses are avoided when the wilted crop is wetted before its preparation with an even and sparing application of a preserving agent, in accordance with the present invention. Furthermore, with the present baler it is possible to use only a cheap thin sheet or foil for covering the silo.

A further advantage of the baler of the present invention resulting from the savings of the preserving agent results also in reducing the danger of corrosion to the parts of the machine wetted by the acid.

The pick-up baler as shown in FIGS. 1 and 2 comprises a baling chamber 1, extending in the direction of travel of the implement, and having a transverse conveyor housing 2 arranged to the side of it. In front of the housing 2 a pick-up device 3 is carried so that it can be adjusted as to height. Its sheet metal guides 4 form at the top a pick-up table 5, at their outlet, and the table 5 ends at the transverse conveyor table 6.

In operation, the baler is drawn over the field by a tractor, upon the rows of material, of straw or hay which are to be compressed.

The loaded material is picked up by the pick-up device 3 and deposited loosely upon the transverse conveyor table 6. The transverse conveyor mechanism 37 is arranged above the conveyor table. It comprises an outer conveyor 38 and an inner transverse conveyor 39, each powered by a crank 40 and driven by links so that they perform a forward movement over the transverse conveyor table 6 in the direction of the bailing chamber 1. After the forward lift, they draw back upwardly.

The inner transverse conveyor 39 moves far into the compression channel to move the material in front of the ram 41. The ram is driven over a piston rod 43 by a crank mechanism 42.

The inner transverse conveyor 39 is arranged to operate in synchronism with the ram-movement so that a portion of the crop is placed in front of the ram 41 on each ram stroke through a lateral opening in the bailing chamber 1 when the ram is in its front rest position.

The portion of the drop introduced, is compressed rearwardly by the ram 41 in bailing chamber 1 onto a rope, from which bales of the desired length are cut off and tied together with twine.

Between the pickup device side walls 7 and 8 and above the sheet metal guides 4 there is a transverse tube 9, which carries a first array of three fan jet nozzles 10, whose jets 11 are directed to the rear towards the pick-up table 5.

On the shaft 12 of the chassis of the baler there is mounted a second array of three fan jet nozzles 13 further directed upwardly.

The mutually overlapping jets 13 spray the sheet of the conveyed crop from below through a gap 15 in the front part of the transverse conveyor table 6.

The additive substance, such as the preservative, preferably is supplied from a storage source under pressure which is controllable proportionally to the density and thickness of the sheet or web as it is delivered from the pick-up means and the dispensing of the additive preferably is also metered out controllably or adjustably by conventional metering devices. Such compacting, pressurizing and metering devices are considered parts of this invention only in their combinations with the basic concepts thereof.

In order to provide a more uniform distribution of the preservative to the unpressed, loose sheets or layers of crop over their whole breadth the nozzles spraying the preservative from above in a row over and in front of the pick-up means are directed with their orifices jetting the liquid towards the rear onto the pick-up table. Underneath the transverse conveyor table a further series of nozzles is provided whose jets are directed upwards through a gap, which extends in the front part of the transverse conveyor table over its whole breadth.

In the embodiment of the invention shown in FIG. 3 the transverse conveyor table 6 is formed as an open grid of sheet metal bars 16 arranged with their broader sides vertically. The spraying is carried out by round jet nozzles 17, which are arranged on the chassis axle 12 and are directed upwards.

In accordance with another improvement of the invention the spraying of the crop from below is carried out by providing the transverse conveyor table with an open grid bottom, under which the upwardly directed spraying nozzles are arranged. In addition or in the alternative the lower part of the rear wall of the transverse conveyor housing is constructed in the form of a grid and forwardly directed nozzles are arranged behind it.

Figure 4:
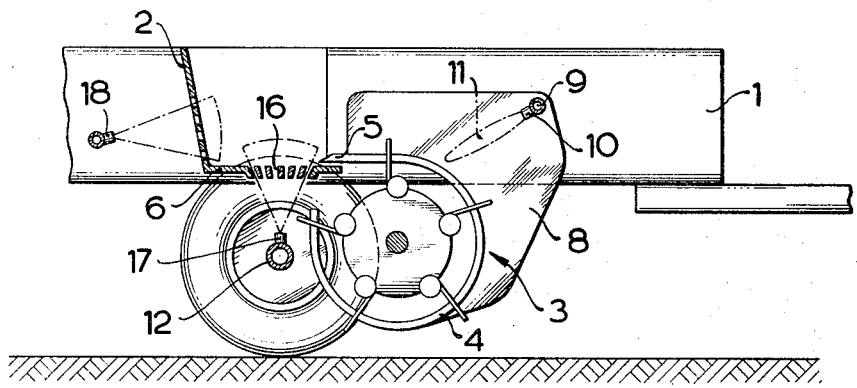

FIG. 4 shows an embodiment of the invention in the case of which in addition the rear wall of the transverse conveyor housing 2 has its lower part constructed in the form of a grid and nozzles 18 are arranged to spray preserving agent from the rear.

In accordance with a further feature of the invention an additional pick-up part is arranged in front of the pick-up device by which the crop is conveyed upwards and thrown onto the pick-up table. Spraying nozzles are arranged in the trajectory followed by the thrown or falling sheet of crop to direct jets from above and below. The additional pick-up part comprises a tedder drum provided in the housing having a gap with the jet orifices of the upper nozzles arranged on it, while the lower nozzles are arranged on the side walls of the housing.

Figure 5:
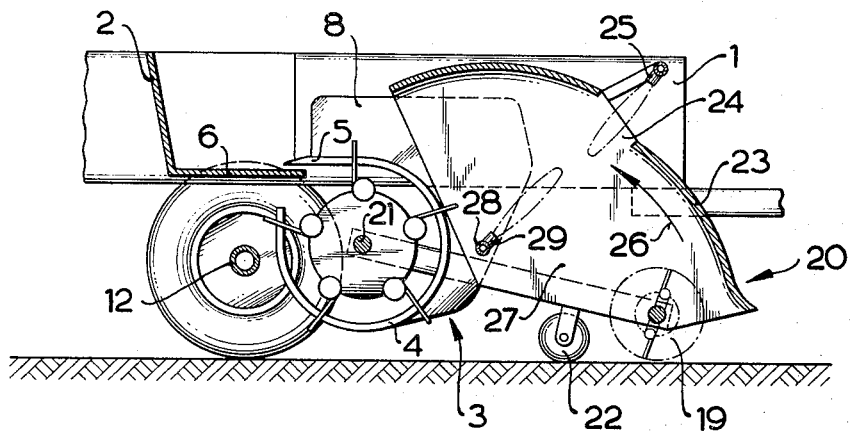

There is shown in FIG. 5, the pick-up device 3, preceded by the additional pick-up part which comprises a tedder drum 19, mounted in a housing 20 and carried on axle 21 of the pick-up part so that it can be adjusted as to height. The tedder drum 19 is guided by support wheels 22 on the ground. The housing cover 23 has a gap 24 extending over its whole breadth and through this gap fan jet nozzles 25 are directed for spraying preserving material onto the sheet of conveyed crop, which is thrown by the tedder drum 19 in the direction of the arrow 26 onto the pick-up table 5. Between the side walls 27, which extend within the side walls 7 and 8 of the pick-up baler, a transverse tube 28 is arranged underneath the trajectory 26 of the sheet of crop. The tube carries nozzles 29 in order to spray the preserving material onto the sheet of crop from below.

In accordance with a further embodiment of the invention the additional pick-up part is constructed as an oblique conveyor armed with tines and which throws the crop over the pick-up device. In this case one row of nozzles is arranged to direct the spray from the front onto the crop as it drops and a second row of nozzles is arranged to direct the preserving agent from behind onto the falling crop.

Figure 6:
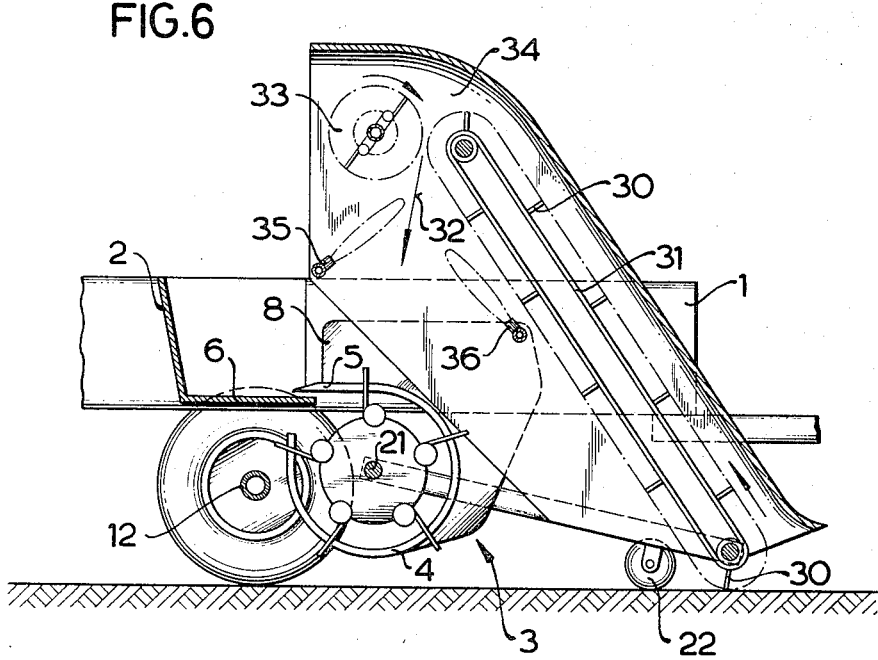

In FIG. 6 an oblique conveyor 31 armed with tines 30 is shown mounted in front of the pick-up device 3. It is pivotably mounted on the pick-up device axle 21 and guided by support wheels 22 over the ground. The point at which crop is thrown from the oblique conveyor lies above the pick-up table 5 so that the crop falls down in the direction of the arrow 32 in the form of a sheet onto the table 5. For this purpose a tine drum 33 can be used to even out the throw and the direction of the thrown material. The oblique conveyor 31 is covered above and to the sides by a housing 34. The side walls lie within the side walls 7 and 8 of the pick-up device and each carries a series of spraying nozzles 35 and 36, which are directed from the front and from the rear onto the sheet of the conveyed crop.

We claim:

1. A pick-up baler, sprayer and compactor of agricultural crops and the like materials, comprising:
   a pick-up means;
   an intermediate conveyor means with a transverse conveyor table means;
   a baling chamber;
   a sprayer means;
   said conveyor table means having a gap;
   said pick-up means including means to pick-up said materials and deposit them upon said intermediate conveyor;
   said intermediate conveyor including means to transfer said materials to said baling chamber;
   said sprayer means including:
   a first set of jet nozzles directed with their orifices from above against the path of said materials;

a second set of jet nozzles including nozzles directed with their orifices from below the path of said materials to produce jets through said gap; and a source of a fluid to be sprayed with conduits connected to said first and second sets of jet nozzles.

2. A pick-up baler as claimed in claim 1,
said pick-up means including a pick-up table;
said first set of nozzles arranged in a row above and in front of said pick-up means;
the nozzles of said first set having orifices directed to produce overlapping jets to the rear toward said pick-up table.

3. A pick-up baler, sprayer and compactor of agricultural crops and the like materials, as claimed in claim 1, said gap extending in the front portion of said conveyor table over the breadth thereof;
said second set of nozzles spaced underneath the entire width of said gap to moisten the entire width of the said materials evenly as it passes over the said gap prior to its compaction.

4. A pick-up baller as claimed in claim 1, said (conveyor including a) gap in said transverse conveyor table (with) being an open grid bottom;
said (sprayer means) second set including nozzles with orifices directed underneath of the bottom of said grid upwardly to produce jets therethrough.

5. A pick-up baler as claimed in claim 1, said intermediate conveyor means having a housing with the lower portion of its rear wall in the form of a grid;
said sprayer means including nozzles, positioned behind said grid with their orifices directed forwardly.

6. A pick-up baler as claimed in claim 1,
said pick-up means further comprising a pick-up table;
an upwardly conveying additional pick-up part with means to throw the picked-up crop in an upward and falling trajectory upon said pick-up table;
said sprayer means including spray nozzles with orifices directed into the trajectory of the crop from above and below.

7. A pick-up baler as claimed in claim 6,
said pick-up means comprising:
a tedder drum housing casing with a tedder drum positioned therein;
said housing casing being provided with a gap;
said sprayer means including upper nozzles arranged on said casing and lower nozzles arranged on the side of said housing.

8. A pick-up baler as claimed in claim 1,
said intermediate conveyor means having a conveyor housing with its lower part forming a bottom;
the lower part of the rear wall of said housing forming a wall grid;
said second set of spray nozzles positioned under said bottom grid directed upwardly, and
a third set of spray nozzles positioned behind said wall grid with their orifices directed forwardly.

9. A pick-up baler, as claimed in claim 1,
said pick-up means including a pick-up table;
said pick-up means preceded by an additional pick-up part including an axle and a tedding drum housing carried on said axle;
a tedding drum mounted within said housing;
means to adjust the height of the drum;
support wheels rolling over the ground to guide the tedder drum;
a gap in the cover of said housing extending over its breadth;
means in said teeder drum to throw the crop upon the pick-up table;
said first set of jet nozzles with orifices directed upon the trajectory of said crop;
a transverse tube under the trajectory of said crop with said
second set of nozzles with orifices directed upwardly toward the trajectory of said crop.

10. A pick-up baler as claimed in claim 1, further comprising a container for fluids connected with said sprayer means and means for pressurizing the container for forcing the fluid through the spraying nozzles.

11. A pick-up baler as claimed in claim 1,
said sprayer means comprising a source of liquid spraying nozzles, and a source of compressed air with means to inject it into said liquid.

12. A pick-up baler as claimed in claim 1,
said baling chamber being elongated in the direction of travel of the implement;
said intermediate conveyor means mounted to the side of said baling chamber;
said pick-up means positioned in front of said intermediate conveyor means;
said baler further comprising:
means to adjust the height of said pick-up means;
guides forming at the top a pick-up table at their outlet;
said pick-up table extending to the said conveyor table.

13. A pick-up baler as claimed in claim 1,
in combination with a vehicle provided with an axle, said transverse conveyor table formed as an open grid of bars arranged with their broader sides vertically;
said sprayer means including a plurality of spray nozzles arranged on said axle and provided with orifices directed upwardly.

14. A pick-up baler as claimed in claim 1,
said pick-up means comprising means to deliver said crop to said intermediate conveyor means in sheet form.

15. A pick-up baler as claimed in claim 1,
said pick-up means comprising a pick-up table and means to deliver said crop to said intermediate conveyor means in layer form;
each nozzle of said first set of nozzles positioned with orifices directed toward the rear upon said pick-up means;
said conveyor table means provided with said gap extending in the front thereof through its breadth.

* * * * *